Jan. 23, 1973 W. L. McKEOWN 3,712,987

TIMING CONTROL APPARATUS

Filed Dec. 23, 1971 5 Sheets-Sheet 3

Jan. 23, 1973        W. L. McKEOWN        3,712,987

TIMING CONTROL APPARATUS

Filed Dec. 23, 1971                      5 Sheets-Sheet 5

United States Patent Office 3,712,987
Patented Jan. 23, 1973

3,712,987
TIMING CONTROL APPARATUS
William L. McKeown, Roswell, N. Mex., assignor to Lek-Trol, Inc., Roswell, N. Mex.
Filed Dec. 23, 1971, Ser. No. 211,567
Int. Cl. H01h 7/00
U.S. Cl. 307—41
27 Claims

ABSTRACT OF THE DISCLOSURE

Timing control apparatus is disclosed for controlling the time intervals during which electrical power is supplied to selected stations. The apparatus includes a rotatable station plate on which are movably mounted a plurality of pins extending from one surface of the plate. Each pin corresponds to a different one of the stations and may be positioned in any one of a set of positions. The position selected determines whether the station corresponding to the pin is to receive power and if so the time interval during which it is to receive power. The station wheel rotates and successively positions each of the pins in an index position and when a particular pin is in the index position, the determination is made as to whether the station to which the pin corresponds is to receive power. This determination is made by means of a clutch device which, in response to a signal, engages a longitudinal arm and causes one end thereof to move until the arm is stopped by the pin in the index position. Power is applied to the station corresponding to this pin during the time interval the arm is moved. Each of the pins may be adjusted so that when in the index position the arm may be moved for a fixed period of time or not at all.

BACKGROUND OF THE INVENTION

This invention relates to timing control apparatus and more particularly to timing control apparatus for controlling the time interval over which electrical power is applied to selected stations.

Timing control apparatus is utilized in a variety of applications for controlling the selection of stations (equipments or locations at which some type of action is to take place) and for controlling the time interval during which such action is to occur at the selected station. One exemplary application is the control of lighting for advertising displays in which it is desired to illuminate particular portions of a display in a particular sequence and for particular lengths of time. Another application is the control of lawn sprinkler systems in which it is desired to selectively sprinkle particular lawn areas for predetermined time intervals. In such systems, the control apparatus typically provides for controlling solenoid operated water valves.

Prior art timing control apparatus oftentimes include either an uneconomical number of electric motors or complicated external gear trains for performing the required control functions. Further, the prior art apparatus generally includes a large number of electrical switches for carrying out the function of selecting or omitting stations at which the controlled actions are to occur. Finally, because of the large number of individual parts, prior art apparatus has generally been complicated and expensive.

SUMMARY OF THE INVENTION

It is an object of the present invention to provide simple and inexpensive timing control apparatus.

It is also an object of the present invention to provide timing control apparatus having a few and inexpensive component parts.

It is a further object of the present invention to provide timing control apparatus which may be inexpensively manufactured and assembled.

These and other objects of the present invention are illustrated in timing control apparatus which includes a station plate for selecting which of a plurality of stations are to receive electrical power and the length of time such selected stations are to receive the power, a longitudinal arm, and a clutch arrangement responsive to a signal for causing one end of the arm to move along a predetermined path near the station plate. The station plate includes a plurality of extensions extending from one face of the plate, each extension corresponding to a different station and each manually positionable to prevent movement of the arm past a selected point when the station plate is in an index position corresponding to the extension. While the arm is being moved, power is applied to the station corresponding to the extension. When movement of the arm is stopped by the extension, power to the corresponding station is interrupted. Each of the extensions are also manually positionable to prevent any movement of the arm and thus prevent application of any power to the station corresponding to that extension.

BRIEF DESCRIPTION OF THE DRAWINGS

A complete understanding of the present invention and of the above and other objects and advantages thereof may be gained from a consideration of the following description of a specific illustrative embodiment presented in connection with the accompanying drawing described as follows.

DETAILED DESCRIPTION

Figure 1:
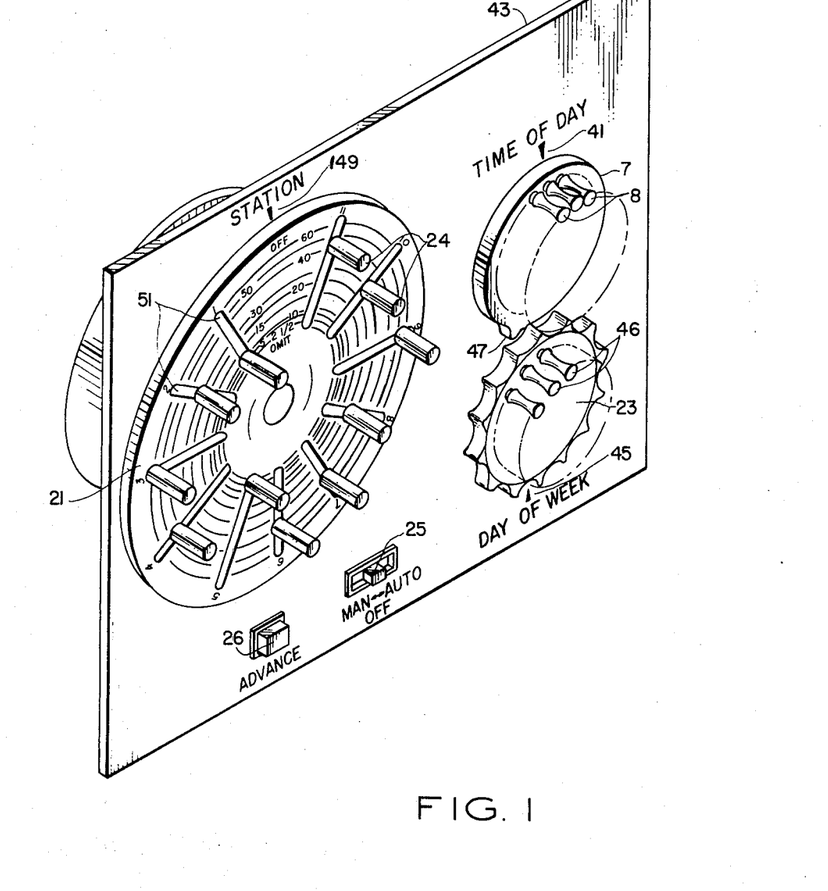
FIG. 1 is a perspective view of the control panel of control apparatus made in accordance with the present invention.
Figure 2:
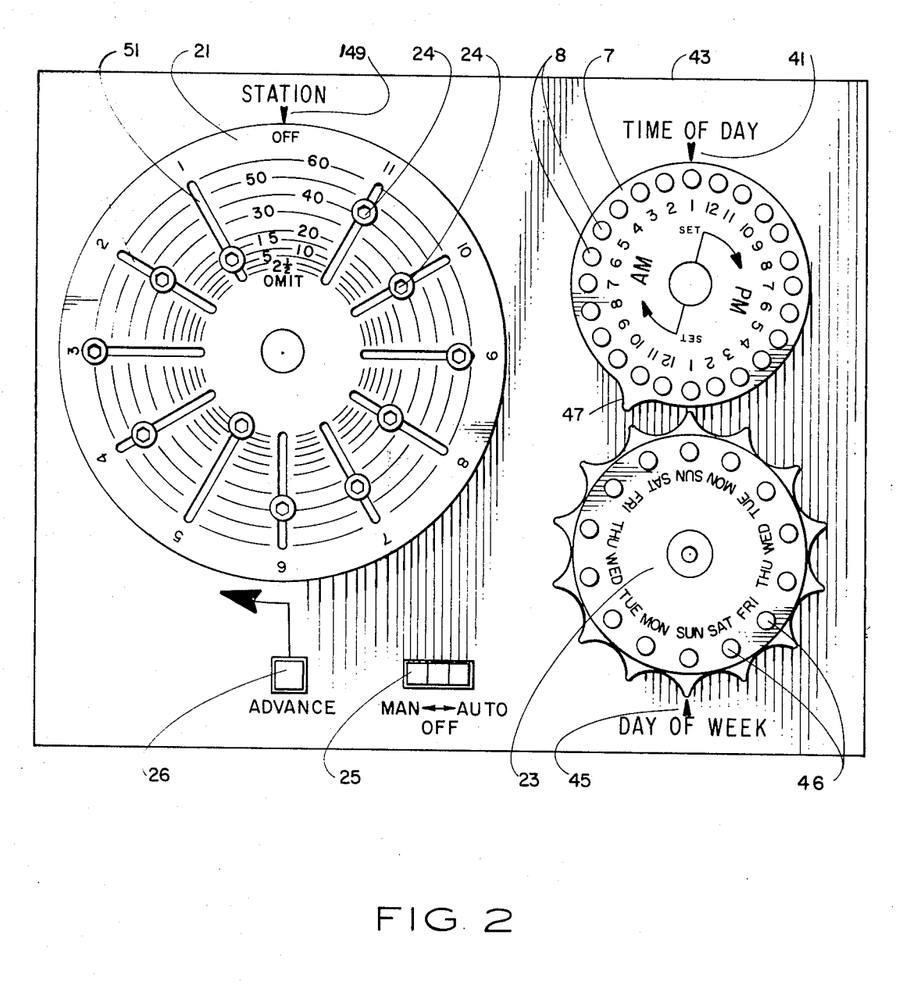
FIG. 2 is a front elevational view of the control panel of FIG. 1.

The specific illustrative embodiment of timing control apparatus shown in FIGS. 1 and 2 include a time of day wheel 7, a day of week wheel 23, a station wheel 21, a mode switch 25, and an "advance" switch 26. The named components are utilized to "program" the operation of the timing control apparatus shown in the drawings.

The time of day wheel 7 and the day of week wheel 23 are used to control the initiation of a control or operation cycle. The time of day wheel is driven by a synchronous clock motor 15 (shown in FIG. 3) to turn one revolution each day. This wheel turns whether or not the control apparatus is in an operation cycle and thus, maintains a reading of the time of day. The time of day is indicated by the "time of day" arrow 41 inscribed on the front panel 43 of the apparatus and by the numerals inscribed near the perimeter of the time of day wheel. The numeral or portion between numerals to which the 'time of day" arrow 41 points identifies the time of day.

The time of day wheel 7 includes twenty-four push-pull pins 8 (one for each hour of the day) which are inserted into bores located about the perimeter of the time of day wheel, each bore being contiguous with an inscribed numeral. As will be more fully described later, each pin may be depressed or pushed into an inward position or may be pulled to an outward position. When a pin is pushed to its inward position, the end of the pin extending from the back side of the time of day wheel 7 is made to protrude from the back side farther than the ends of the other pins.

The day of week wheel 23 maintains a reading of the day of the week in a manner similar to that employed by the time of day wheel to maintain a reading of the time. Designations of the days of the week over a two week period are inscribed near the perimeter of the day of week wheel 23 and these designations, in conjunction with a "day of the week" arrow 45, provide an indication of the proper day of the week. The day of week wheel 23 is advanced once each day (at midnight) by the single tooth 47 on the rim of the time of day wheel 7. The tooth 47 moves the day of week wheel 23 until a detent action, provided by detent spring 29 (shown in FIG. 4), causes the day of week wheel to index to the next position. The day of week wheel 23 thus is successively moved once each day through fourteen positions, each position corresponding to a particular day of the week.

The day of week wheel 23 includes fourteen push-pull pins 46 (one for each day of a two-week period) which are inserted in bores located about the perimeter of the day of week wheel. These pins, just as with the pins of the time of day wheel 7, may be pushed to an inward position or may be pulled to an outward position.

For an operation cycle to be initiated, at least one pin on the time of day wheel and one pin on the day of week wheel must be in their inward position and the switch 25 must be placed in its automatic (AUTO) position. For example, if it were desired that an operation cycle commence at 6 p.m. on the Tuesday next following the Sunday indicated by the setting of the day of week wheel 23 of FIG. 2, then the pin corresponding to the time "6 p.m." on the time of day wheel would be pushed inwardly and the pin corresponding to the next following Tuesday would be pushed inwardly. Then, when the day of week wheel were rotated so that the day of week arrow 45 pointed to the pin in the inward position and the time of day wheel were rotated until the time of day arrow 41 pointed to the pin in the inward position, two switches (as will be discussed later) would be operated to initiate an operation cycle. Of course, the time of day wheel and day of week wheel could be "programed" to cause initiation of an operation cycle at a variety of different times and days. As will also be discussed later, if the switch 25 is in the manual (MAN) or OFF position, an operation cycle will not be initiated by the time of day and day of week wheels.

The station wheel 21 (see FIGS. 1 and 2) is provided to control the selection of stations to which power will be supplied (which in turn may control the selection of lamps to be lighted, areas to be watered, etc.) and the length of time power will be supplied to a selected station. The station wheel includes a plurality of longitudinal slots extending radially outward from near the center of the wheel. A bolt 53 (FIG. 3) is disposed in each slot and extends beyond both the front and back surfaces of the wheel 21. An adjustment knob 24 is mounted on that end of each bolt 53 which extends from the face of the wheel 21 so that when the knob 24 is turned, the bolt 53 also turns. Each bolt 53 might illustratively be secured in the slot by a nut fitted between two corresponding guides located on the rear surface of the wheel 21 and running on either side of and parallel to a corresponding slot. The distance between the guides would be sufficient to allow a hexagonal or square nut, when placed between the guides with the plane of the nut parallel to the plane of the wheel 21, to be slid along the length of the guide but not to be rotated within the guides. Then, a bolt 53 could be screwed into a nut positioned in its corresponding pair of guides until the corresponding adjustment knob 24 contacted the face of the wheel 21 to thereby secure the positioning of the adjustment knob and bolt. The knob and bolt could be repositioned simply by loosening the bolt from its corresponding nut and then sliding the bolt along the length of the slot to the position desired and retightening the adjustment knob against the face of the station wheel 21.

Each slot and adjustment knob corresponds to a different station identified by the number on the perimeter of the wheel 21 adjacent to the slot. Since there are eleven such slots shown for the station wheel of FIGS. 1 and 2, the illustrative control apparatus is capable of controlling the application of power to eleven different stations.

A plurality of circular lines are inscribed on the face of the station wheel 21 to identify different time intervals. The lines closest to the center of the station wheel indicate shorter time intervals whereas the lines near the perimeter of the station wheel indicate longer time intervals. The interval of time during which power is to be applied to a particular station is determined by positioning the station's corresponding adjustment knob 24 so that it is contiguous with the line designating the desired time interval. In FIG. 2, for example, the adjustment knob for station 1 is positioned between the lines designating 10 and 15 minute intervals and therefore upon initiation of an operation cycle, station 1 would be supplied with power for approximately 12½ minutes.

If it is desired that a station not receive power during a particular operation cycle, that station's adjustment knob is positioned at that end of the corresponding slot closest to the center of the station wheel 21. This position is labeled "OMIT" and indicates that the station whose knob is in the OMIT position is not to receive power.

The station wheel 21 is said to be in an index position when a station arrow 149 points to one of the station numerals or to the OFF designation on the perimeter of the wheel. As will be more fully described later, when an operation cycle is initiated (and when switch 25 is in the AUTO position), the station wheel 21 will be successively rotated from one index position to the next. When in an index position, power is applied to the station corresponding to the numeral to which the arrow 149 points for a period of time indicated by the station's adjustment knob.

Figure 3:
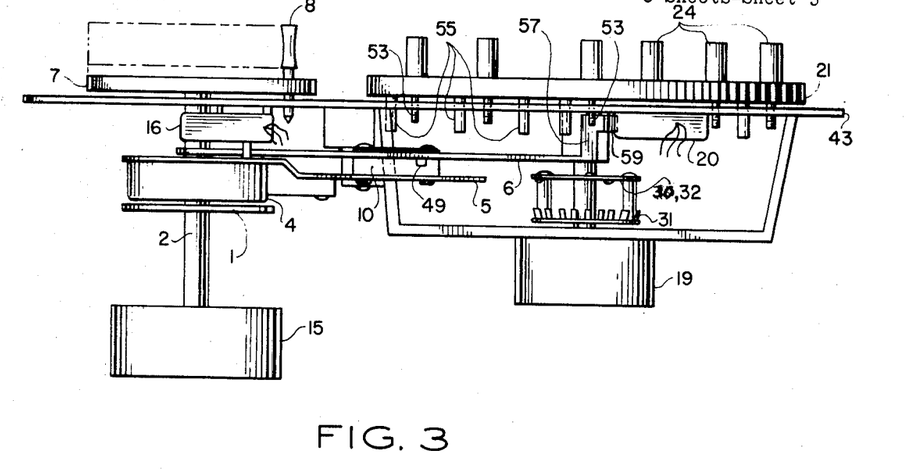
FIG. 3 is a top view of timing control apparatus made in accordance with the principles of the present invention.
Figure 4:
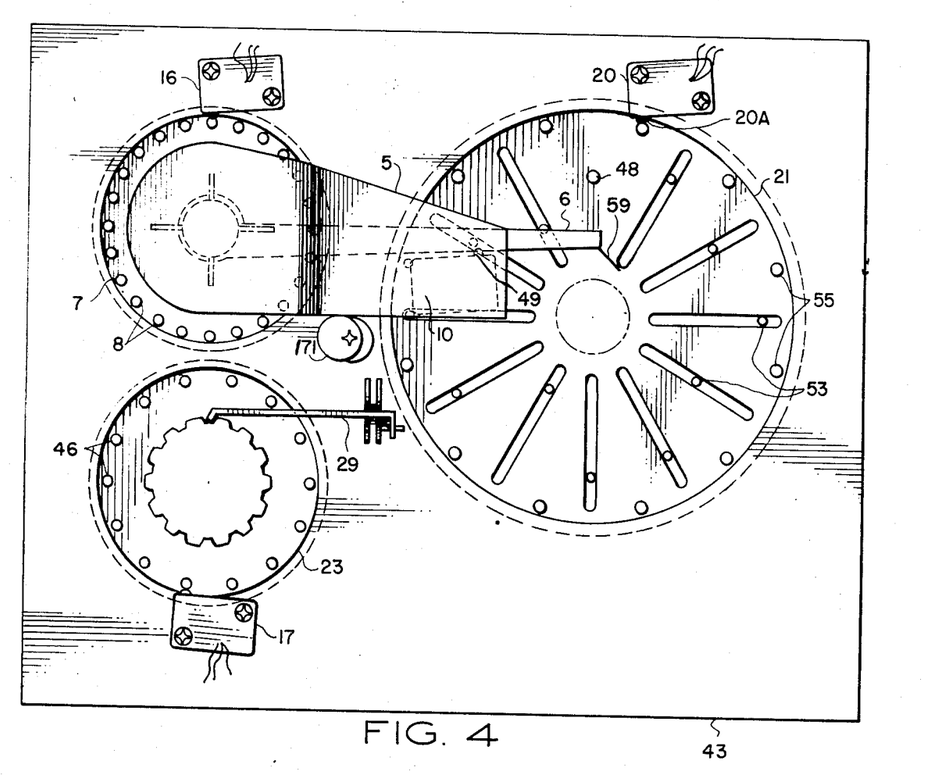
FIG. 4 is a back elevational view of a portion of the control apparatus of FIG. 3.

The station wheel 21 also includes a plurality of protuberances or pins 55 extending from the rear of the wheel in a direction substantially perpendicular to the plane of the wheel (FIGS. 3 and 4). Each of these pins corresponds to a different index position so that when the station wheel 21 is an index position, the corresponding "index pin" depresses the plunger 20A of a switch 20. The function of switch 20 will next be discussed in conjunction with FIG. 5.

Figure 5:
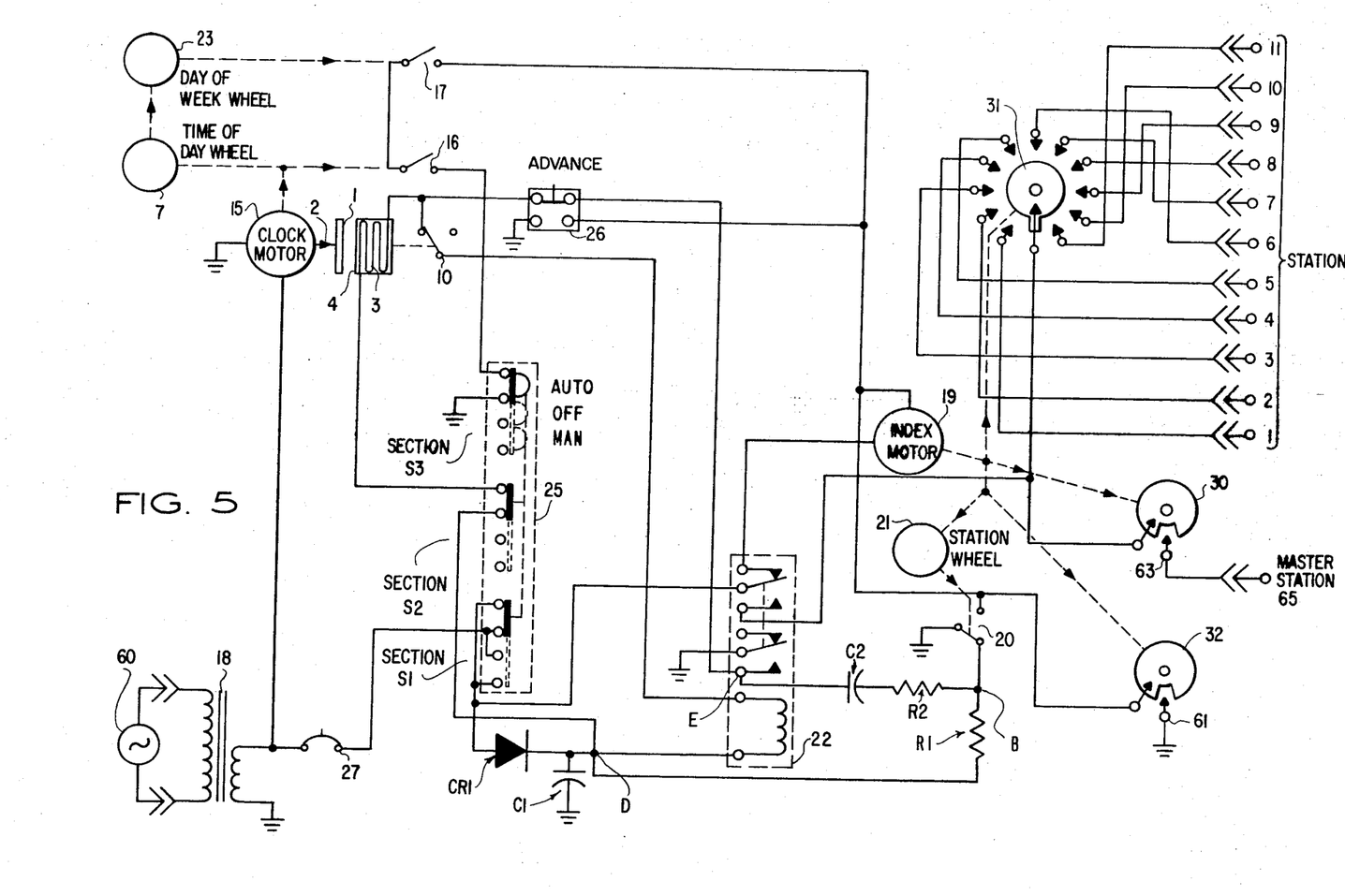
FIG. 5 is a schematic representation of illustrative circuitry utilized in timing control apparatus made in accordance with the principles of the present invention.

FIG. 5 shows the circuitry of the timing control apparatus. The solid lines interconnecting various components represent electrical interconnections whereas the dashed lines represent mechanical connections. As indicated in FIG. 5, when the station wheel 21 is in an index position, the switch 20 is operated so that a junction B of the circuit of FIG. 5 is at ground potential. When junction B is at ground potential, a capacitor C2 is maintained in a charged condition by a D.C. voltage received from a junction D via the coil of a relay 22, a switch 10, a switch 26 and a junction E. The source of D.C. voltage at junction D is provided through the action of a rectifier CR1 and a filter capacitor C1 operating upon an A.C. voltage received via section S1 of switch 25 and a circuit breaker 27 from the secondary winding of a transformer 18. An A.C. supply 60 is connected to the primary winding of the transformer 18 to provide the A.C. power.

The relay 22 is engineered so that the current through the coil of the relay is insufficient to operate the relay when the capacitor C2 is in the charged condition. The relay 22 is therefore in its unenergized or unoperated condition with its two sets of contacts as shown in FIG. 5 when the station wheen 21 is in the OFF position.

An index motor 19 drives the station wheel 21 and wafer switches 30, 31 and 32 causing the station wheel and wafer switches to rotate when power is supplied to the index motor 19. (Switches 30, 31 and 32 could be different sections or tiers of a single wafer switch, but for ease of description, they are treated as separate switches.) One side of the motor 19 is connected via one set of contacts of the relay 22, section S1 of the switch 25 and the circuit breaker 27 to the secondary winding of the transformer 18. The other side of the index motor 19 is connected to switch 17, to switch 26, to switch 20 and to the wafer switch 32. Note that when the station wheel is in the OFF position and an operation cycle has not yet been initiated, the circuit of the index motor is not completed to ground and therefore the motor is not running.

Now assume that the station wheel 21 is in the OFF position and that the adjustment knobs for stations 1 and 2 are not in the OMIT position, but that the adjustment knob for station 3 is in the OMIT position. Also assume that the switch 25 is in the AUTO position and that selected ones of the pins on the time of day and day of week wheels have been depressed to their inward positions. With the station wheel 21 in the OFF position, wafer switches 30, 31 and 32 are in the position shown in FIG. 5. Also, under the initial conditions assumed, switches 16, 17 and 20 and relay 22 are in the position shown in the FIG. 5 and the capacitor C2 is charged (as will be evident after the description of the operation of the apparatus, the capacitor C2 is left in a charged condition following completion of an operation cycle).

The secondary winding of the transformer 18 supplies power to a clock motor 15 to continuously operate the motor. When the time of day wheel 7 and the day of week wheel 23 are rotated to positions in which the time of day arrow 41 and day of week arrow 45 (FIG. 2) point to a particular hour and day whose corresponding pins 8 and 46 are placed in their inward positions, then the designated pins are positioned to depress plungers on switches 16 and 17 thereby closing the switches. The spatial arrangement of the switches 16 and 17 with respect to the time of day wheel and day of week wheel is shown in FIGS. 3 and 4. Each of the switches 16 and 17 are positioned so that when a pin on a corresponding wheel is rotated toward the plunger of the switch, the plunger is depressed only if the pin is placed in its inward position. If a pin is in its outward position, the end of the pin will not extend a sufficient distance to operate the plunger of the switch (16 or 17).

When the switches 16 and 17 are closed coincidentally, by the time of day and the day of week wheel respectively, ground potential is applied via section S3 of the switch 25 and the switches 16 and 17 to the return side of the index motor 19 (FIG. 5). This turns on the motor causing it to advance the station wheel 21 toward the index position for station 1 and to advance the rotary wiper arms of switches 30, 31 and 32. As the station wheel 21 begins to rotate, switch 20 is released by the index pin corresponding to the OFF position of the station wheel thereby providing another ground return for the index motor 19 through switch 20 and coincidentally removing the ground from junction B. As the rotary wiper arm of wafer switch 32 is rotated, it contacts a contact point 61 providing still another ground return for the index motor 19. Switch 32 will then provide a ground return for the index motor 19 throughout the remainder of the operation cycle even though the time period of the operation cycle will exceed the time during which the push-pull pin on the time of day wheel maintains the switch 16 in its closed position. Thus, after an operation cycle is initiated, it will be completed regardless of the action of switch 16 or 17.

As already indicated, as the station wheel 21 commences to rotate, ground potential is removed from junction B. With the removal of ground from junction B, the capacitor C2 discharges through a path including switch 26, switch 10, the coil of the relay 22, a resistor R1, and a resistor R2. The current through the relay coil is limited by the resistor R1 to a level below that necessary to operate the relay. As the station wheel 21 advances to its next index position (corresponding to the index position for station 1), the index pin of station 1 extending from the back of the station wheel 21 depresses the plunger of switch 20 thereby again placing junction B at ground potential. The capacitor C2 now charges through the coil of the relay 22 providing a sufficient current through the coil to operate the relay. When the relay operates, the circuit supplying power from the transformer 18 to the index motor 19 is opened (by the upper relay contacts) and the motor stops. At the same time, junction E is placed at ground potential through the bottom relay contact and this provides a latching action which maintains the relay 22 in the energized condition. Energizing current flows from the junction D through the coil of the relay 22 and via switch 10 and switch 26 to ground. The capacitor C2 also discharges since ground potential is placed on both sides of the capacitor.

With junction E placed at ground potential, D.C. current also flows from junction D through section S2 of switch 25, through a clutch coil 3 and through the switch 26 to ground. The clutch coil 3 is located within a cylindrically shaped clutch housing 4 shown in FIG. 3. The shaft 2 of the clock motor 15 which drives the time of day wheel 7 passes through a bore in the clutch housing to the time of day wheel. This bore is coincident with the axis of the cylindrically shaped housing. The housing 4 and coil 3 are not attached to the shaft 2 of the clock motor 15 so that the shaft may rotate freely in the bore of the clutch housing 4 without causing the clutch housing to rotate.

A circular clutch face plate 1 is mounted on the shaft 2 of the clock motor 15 so that one surface of the face plate 1 is contiguous with one end of the clutch housing 4. (See FIG. 3.) The clutch face plate 1 rotates with the rotation of the shaft 2 of the clock motor 15. A clutch extension 5 is mounted on the end of the clutch housing 4 opposite the end contiguous with the clutch face plate 1. The clutch extension 5 extends in a direction substantially perpendicular with the axis of the clutch housing 4 and toward the station wheel 21. The pull of gravity causes the clutch extension 5 to rest on a stop 171 (FIG. 4). The switch 10, which includes a plunger 49 to operate the switch, is mounted on the clutch extension 5 so that the plunger 49 extends upwardly from the direction of the pull of gravity. The clutch assembly of the apparatus also includes a trip arm 6 one end of which includes a bore through which the shaft 2 of the clock motor 15 passes. The trip arm 6, which is free to rotate about the shaft 2 of the clock motor 15, is positioned to lay across and be supported by the plunger 49 of the switch 10. The weight of the arm, however, is insufficient to depress the plunger of the switch 10. The trip arm 6 extends across the plunger 49 of the switch 10 in a plane substantially parallel with the plane of the station wheel 21 to a point behind the station wheel. The end of the trip arm 6 which extends behind the station wheel 21 includes a lateral extension 57 (FIG. 3) directed toward the station wheel 21 and positioned below one of the bolts 53 when the station wheel 21 is in an index position. The trip arm 6 further includes a tab 59 extending from the lateral extension 57 downwardly and toward the direction from which the bolts 53 approach as the station wheel 21 is rotated. (The station wheel 21 as shown in FIG. 4 rotates in the counterclockwise direction.)

The current through the clutch coil 3 (caused by relay 22 operating) induces a magnetization of the clutch housing 4 thereby creating a magnetic attraction between the clutch housing 4 and the clutch face plate 1 causing the clutch housing to be attracted to and to engage the clutch face plate. The friction between the clutch housing 4 and the clutch face plate 1 causes the clutch housing 4 and clutch extension 5 to rotate with the clutch face plate 1 as it is turned by the clock motor 15. Since the trip arm 6 is resting on the plunger of the switch 10 mounted on the clutch extension 5, as the clutch extension 5 is rotated, the trip arm 6 is caused to pivot upwardly about the shaft of the clock motor 15. Since the station wheel 21 is in the index position corresponding to station No. 1, the lateral extension 57 of the trip arm 6 moves upwardly toward the bolt 53 corresponding to station 1.

An additional action which occurs upon the operation of relay 22 is that power is applied via the upper contacts of the relay to wafer switches 30 and 31 (FIG. 5). The rotary wiper arm of wafer switch 30 will have been advanced by the index motor 19 so that it contacts contact point 63 allowing power to be applied to a master station 65. The master station 65 might illustratively control a master valve or pump starter of a lawn sprinkler system. The rotary wiper arm of wafer switch 31 also will have been rotated (in the clockwise direction) by the index motor 19 to a point where the wiper arm connects power to station 1. Station 1 might illustratively control a solenoid operated water valve which in turn controls the sprinkling of a particular area of lawn. Power will continue to be applied to station 1 until the relay 22 assumes its unoperated condition.

As the clock motor 15 continues to run, the trip arm 6 is raised by the clutch extension 5 and switch 10 at a rate determined by the speed of rotation of the shaft of the clock motor. As indicated earlier the shaft of the clock motor turns one revolution per day, thus the angular rotation rate of the trip arm is 15° per hour. The trip arm 6 continues to raise until the lateral extension 57 of the trip arm contacts the bolt 53 corresponding to station 1, at which time further movement of the arm is prevented. The interval of time during which the trip arm 6 is raised will depend on the vertical position in the slot at which the bolt 53 corresponding to station 1 is secured. This interval of time will be indicated by the time scale on the face of the station wheel 21.

After the trip arm reaches a position where further movement is prevented, continued rotation of the clutch extension 5 by the clock motor 15 causes the plunger of the switch 10 to be depressed by the trip arm 6 thereby opening the switch. When the switch 10 opens, the circuit to the coil of relay 22 is opened so that the relay assumes its unoperated condition, i.e. each armature of the relay closes on its upper contact (FIG. 5). When this occurs, power is again applied to the index motor 19 and the motor commences to run. In addition, current flows from junction D through the clutch coil 3 and the switch 26 to charge the capacitor C2. This charging current maintains the magnetic attraction between the clutch housing 4 and the clutch face plate 1 to keep the clutch extension 5 and trip arm 6 in their raised position. When the capacitor C2 becomes charged to the point where insufficient current flows through the clutch coil to maintain clutch engagement, the clutch extension 5 (and thus the trip arm 6) falls under gravity toward the stop 171 (see FIG. 4). As the clutch extension 5 falls, the pressure exerted by the trip arm on the plunger of the switch 10 is relieved so that the plunger assumes its extended position and the switch 10 closes. Since, at this time, the capacitor C2 is almost fully charged, current through the relay coil, resulting when switch 10 closes, will not be sufficient to operate the relay.

As the station wheel 21 advances toward the index position for station 2, the index pin corresponding to station 1 releases the switch 20 thereby removing ground potential from junction B and causing the capacitor C2 to discharge. The circuitry of FIG. 5 is now in a condition to repeat the above-described operation but with respect to station 2 rather than station 1.

It was assumed that the adjustment knob of station 3 was secured in the OMIT position on the station wheel 21. Under this assumption, as the station wheel 21 advances from index position 2 to index position 3, the following sequence of actions takes place. The bolt 53 corresponding to station 3 (and being in the OMIT position) advances toward the tab 59 of the lateral extension 57 of the trip arm 6 and engages the tab. As the station wheel and bolt continues to advance, the trip arm 6 is forced downward by the action of the bolt 53 engaging and sliding over the tab 59. As the trip arm 6 is depressed downwardly, the switch 10 is opened. As the station wheel 21 advances to the index position corresponding to station 3, the switch 20 is operated by the index pin of station 3. Junction B is thus placed at ground potential (as before). Since switch 10 is open, the circuit to the coil of the relay 22 is open and the relay does not operate. Thus, power to the index motor 19 is not interrupted and the index motor continues to run so that the station wheel 21 advances toward the next index position (corresponding to station 4). The lateral extension 57 maintains the trip arm 6 against the plunger of the switch 10 so that the switch is in its open position until the index pin corresponding to station 3 has operated and released switch 20. After the station wheel 21 has rotated through the index position corresponding to station 3 and the bolt 53 has slid over and off the lateral extension 57 switch 10 is again closed and the FIG. 5 circuitry is ready to either index to or "omit" the next station (depending on the setting of the adjustment knob corresponding to that station).

The operation of the FIG. 5 circuitry includes a so-called dummy sequence which occurs after power has been applied to the last station (station 11) and when the station wheel 21 is in its OFF position. This sequence is included for the following reasons. It is possible to set the adjustment knobs 24 so that the stations are either omitted or receive power for a very short period of time. If most of the stations were either omitted or were to receive power for a short period of time, the total operation cycle may be sufficiently short so that the switch 16 operated by the time of day wheel 7 would still be held closed at the end of the cycle because the advance of the time of day wheel 7 was insufficient to release the switch. If the switch 16 were not released after such an operation cycle (and of course switch 17 would not be released), conditions would be proper for the initiation of another operation cycle. This would not be desirable and for this reason, the dummy sequence is provided to give the time of day wheel 7 time to release the switch 16 at the end of an operation cycle. An additional reason for the dummy sequence is to end the operation cycle with relay 22 un-energized while the apparatus is at reset. This is desirable to reduce the power consumption of the apparatus while it is at rest between operating cycles.

The dummy sequence is as follows. As the station wheel 21 leaves the index position of the last station (station 11) and advances toward the OFF position, conditions are identical to those where the station wheel is advancing towards another station. Specifically, switch 20 is operated when the station wheel 21 reaches the OFF position, causing the relay 22 to energize and open the circuit to the index motor thus stopping the motor. With the station wheel 21 in the OFF position, the wiper arms of wafer switches 30 and 32 are out of contact with contacts 63 and 61 respectively so that the master station 65 is disconnected from the FIG. 5 circuitry and one of the ground returns to the index motor 19 is removed. Thus, at this time, the only ground return to the index motor 19 would be via switches 16 and 17. The dummy sequence which follows provides a sufficient time interval to allow the time of day wheel 7 to advance to a point where switch 16 is released and the only remaining ground return of the index motor 19 is removed. After the station wheel 21 advances to the OFF position and the relay 22 is energized, the clock motor 15 raises the clutch extension 5 and trip arm 6 until the movement of the trip arm 6 is arrested by a fixed pin 48 protruding from the rear of the station wheel 21 (see FIG. 4). This pin is placed in a position to stop the movement of the trip arm after a fairly long time interval, e.g. 40 or more minutes, to give the time of day wheel 7 sufficient time to release switch 16. When the trip arm 6 is stopped, switch 10 is opened and the clutch extension 5 and trip arm 6 fall under the weight of gravity to the stop 171. Since all possible ground return circuits to the index motor 19 are open, the index motor does not turn on and the station wheel 21 remains in its OFF position. The capacitor C2, at this time, is in a charged condition ready for initiation of a new operation cycle in accordance with the "programming" of the time of day and day of week wheels. The relay 22 is un-energized, and so consumes no power while the apparatus is at rest.

The FIG. 5 circuitry has been described assuming that switch 25 is set in the AUTO position for automatic operation. The FIG. 5 circuitry may also be operated in a so-called manual mode by setting the switch 25 in the MAN position. In this position, switch 25 in effect disables that portion of the FIG. 5 circuitry which provides for automatic sequencing of operations. The user can then select a given station to which power is to be applied and the time period for applying the power. Selection of the station is made by depressing the ADVANCE button which opens the upper contacts of switch 26 and closes the lower contacts thereby breaking the relay coil circuit and supplying a ground potential to the index motor 19. With the upper contacts of the relay unoperated, and a ground return provided for the index motor 19, the index motor commences to run. The ADVANCE button must be held down to keep the index motor 19 running until the wiper arm of wafer switch 32 contacts the contact point 61. When the wiper arm of the switch 32 contacts the contact point 61, the ADVANCE button may be released and the index motor 19 will advance to the next index position. When this occurs, the relay 22 is operated causing the interruption of power to the index motor 19 and the application of power to the station corresponding to the index position of the station wheel 21. Since the circuit of the clutch coil 3 is opened by the setting of switch 25 in the MAN position, the clutch extension 5 and trip arm 6 will not be raised by rotation of the clock motor and thus the circuitry of FIG. 5 will continue to cause power to be applied to the station until the user again depresses the ADVANCE button or sets the switch 25 to the AUTO position. When the switch 25 is in the MAN position, the station wheel 21 may be advanced past an index position simply by holding the ADVANCE button in the depressed position. Even if the switch 25 is in the AUTO position, the station wheel may be advanced by depressing the ADVANCE button. Thus, the ADVANCE button may be used to advance the station wheel 21 in the middle of an operation cycle or when the switch 25 is in the MAN position.

When the switch 25 is in the OFF position, all circuits of the FIG. 5 circuitry are open except that the clock motor 15 from the transformer 18. Thus, the clock motor 15 continues to run and thereby maintains a reading of the time of day and day of week.

Figure 6:
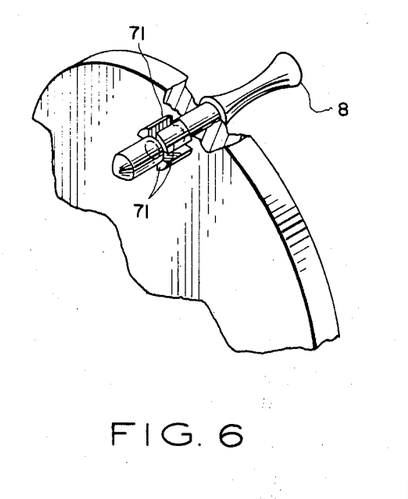
FIG. 6 is a perspective view of the back of the time of day wheel 7 of FIG. 1 showing the structure of one of the push-pull pins.
Figure 7:
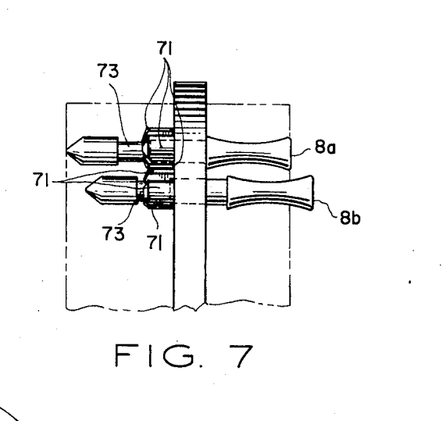
FIG. 7 is a side view of the time of day wheel and two of the push-pull pins.
Figure 8:
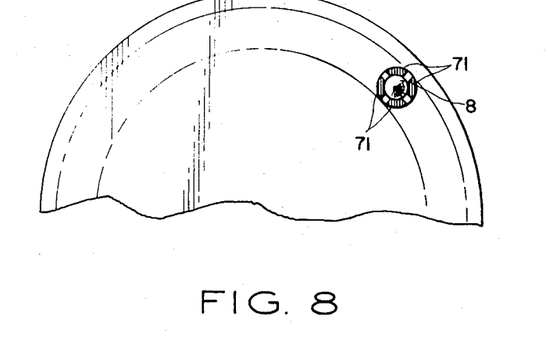
FIG. 8 is an elevational view of the back of the time of day wheel showing one of the push-pull pins.

One portion of the structure of the timing control apparatus remains to be described—that being the push-pull pins 8 and the structure of the time of day and day of week wheels which provide for securing the pins. Because of the simplicity of the structure, it may be economically manufactured and assembled. FIGS. 6, 7 and 8 illustrate the structure in question.

The time of day and day of week wheels each include a plurality of bores located near the perimeter thereof into which the push-pull pins 8 are inserted. The axis of each bore is substantially perpendicular with the plane of the wheel. A group of four fingers 71 is positioned about each bore, each finger of a group extending outwardly from the back side of the wheel in a direction substantially perpendicular with the plane of the wheel. The end of each finger of a group is turned inward toward the axis of the bore about which the group is positioned so that the ends of the fingers of a group describe a circle into which a push-pull pin is inserted. The fingers and wheel comprise a unitary structure made, for example, of injected molded plastic or some other material which will allow the fingers to flex.

Each push-pull pin comprises an elongated cylindrical body, one end of which tapers to a point. Each pin has a substantially uniform diameter except for a certain portion 73 near the tapered end which has a reduced diameter of substantially uniform dimension. When a pin is inserted into a bore, from the frontside of the wheel to the backside, tapered end first, the tapered end flexes the fingers 71 so that the ends thereof slide over the portion of the pin near the tapered end until they close about the portion 73 of the pin having the reduced diameter. The ends of the pins engage and contact the reduced portion 73 to secure the pin in the bore while also allowing the pin to be slidably moved between an inward position (as shown by pin 8a of FIG. 7) and an outward position (as shown by pin 8b). When in either the inward or outward position, the ends of the fingers 71 abut against the shoulder formed by the diameter difference between the portion 73 and the rest of the pin, thereby limiting movement of the pin to between the inward and outward positions.

It is clear from the above description of one illustrative embodiment of the present invention that numerous alternative embodiments and modifications could be devised by those skilled in the art without departing from the spirit and scope of the invention. The appended claims are intended to cover all such apparent and obvious modifications.

What is claimed is:

1. In a system for supplying electrical power to selected ones of a plurality of stations, apparatus for controlling the selection of stations and the time intervals during which power is applied to selected stations, said apparatus comprising:

a longitudinal arm,
clutch means for causing at least one end of said arm to move along a predetermined path at a predetermined rate of speed,
a plurality of stop means each corresponding to a different station, means whereby each of said stop means is manually positionable to stop the movement of said arm at some instant of time after the application of power to the station to which the stop means corresponds, and
means responsive to said clutch means for applying power to a selected station during the time interval of movement of said arm, said time interval being determined by the position of the stop means corresponding to the selected station.

2. Apparatus as in claim 1 wherein said clutch means comprises a motor including a rotatable shaft, means responsive to the application of power to a selected station for engaging said shaft to thereby rotate with said shaft, a switch including a plunger which, when depressed, opens the switch, and when extended, closes the switch, said switch being mounted on said engaging means in a position so that as the engaging means rotates, said longitudinal arm rests on the plunger of said switch causing said one end of said arm to move along said predetermined path until stopped by the stop means corresponding to the selected station, whereupon said arm causes the depression of the plunger of said switch upon the continued rotation of said engaging means to open said switch, said switch being connected in circuit with said applying means so that upon opening of said switch, application of power to the selected station is prevented.

3. Apparatus as in claim 2 wherein said engaging means comprises a clutch face plate mounted on said shaft, a cylindrically shaped clutch housing, one end of which is disposed adjacent to one surface of said clutch face plate, a coil of wire disposed in said clutch housing such that when the coil is energized, the clutch housing is attracted toward said clutch face plate thereby causing said one end of said clutch housing to contact and engage said one surface of said clutch face plate, said clutch housing including a longitudinal extension on which is mounted said switch.

4. Apparatus as in claim 1 further comprising a rotatable station plate on which are mounted said plurality of stop means and wherein said stop means each comprises a manually positionable protuberance extending from one surface of said station plate.

5. Apparatus as in claim 4 wherein said rotatable station plate has a plurality of slots each corresponding to a different station and extending radially from near the center of the plate to near the perimeter thereof and wherein each of said protuberances comprises a finger mounted in a different one of said slots so that one end of the finger extends outward from one surface of said station plate and so that the finger may be slidably positioned at any position along the length of the corresponding slot.

6. Apparatus as in claim 5 wherein said station plate further includes a time scale inscribed on one surface thereof on a portion of the plate contiguous to at least one of said slots, said time scale indicating, for any position of a finger, the time which will elapse during the application of power to the station corresponding to that finger.

7. Apparatus as in claim 4 further comprising first means for causing said station plate to rotate and to successively position each of said protuberances in an index position in which the protuberance may contact and stop the movement of said arm and second means for successively interconnecting each of said stations to a power source when the protuberance corresponding to that station is in said index position.

8. Apparatus as in claim 7 wherein said one end of said arm includes a lateral extension for engaging said stop means, said lateral extension including a tab curving toward the direction of approach of said protuberances as said station plate rotates so that when a protuberance is positioned in a certain position, the protuberance will contact and slide over said tab and extension as the protuberance is rotated into the index position thereby preventing any movement of said arm while the protuberance is in the index position.

9. Apparatus as in claim 7 wherein said interconnecting means comprises a wafer switch having a plurality of stator contacts, each connected to a different station and a rotary wiper arm connected to said power source for successively contacting each of said stator contacts.

10. Apparatus as in claim 9 wherein said protuberances of said station plate comprise a plurality of fixed index pins extending from one surface thereof, each of said index pins corresponding to a different one of said index positions, and wherein said apparatus further comprises third means operable by an index pin when the station plate is in the index position to which the index pin corresponds to inhibit said first means from causing rotation of said station plate and to interconnect said rotary wiper arm with said power source.

11. Apparatus as in claim 10 wherein said first means comprises an electric motor and wherein said third means comprises a capacitor, a switch circuit operable by said index pins for applying current to said capacitor to thereby charge the capacitor, and a switch device having open and closed positions for interconnecting said electric motor with said power source when in the closed position and responsive to said charging current for assuming the open position and thereby disconnecting said electric motor from said power source and interconnecting said rotary wiper arm with said power source.

12. Apparatus as in claim 11 wherein said switch device comprises an electromagnetic relay whose coil is connected in circuit with said capacitor such that when current is applied to charge said capacitor the relay operates to the open position.

13. Apparatus as in claim 11 further including means for latching said switch device in the open position.

14. Apparatus as in claim 11 further comprising means responsive to said switch device being in the open position for enabling said clutch means to cause said one end of said arm to move along said predetermined path.

15. Apparatus as in claim 14 wherein said applying means comprises a switch responsive to the stoppage of movement of said arm for causing said switch device to assume the closed position and for disabling said clutch means from causing said one end of said arm to move along said predetermined path.

16. Apparatus as in claim 15 further comprising manually operable means for causing said switch device to assume the closed position.

17. Apparatus as in claim 7 further comprising a first wheel rotatable at a constant speed of one revolution per predetermined time period, a plurality of protuberances extending from one surface of the wheel and located near the perimeter thereof so as to traverse a substantially circular path as the wheel rotates, each protuberance corresponding to a particular time of day and being adjustable to extend first and second distances from the surface of the wheel, a second rotatable wheel responsive to each complete revolution of said first wheel for rotating a predetermined fraction of a revolution, a second plurality of protuberances extending from one surface of said second wheel and located near the perimeter thereof so as to traverse a substantially circular path as the second wheel rotates, each protuberance of said second plurality corresponding to a particular predetermined time period and being adjustable to extend first and second distances from the surface of the second wheel, a first switch including a plunger which, when depressed, closes said first switch, said first switch being mounted so that the plunger thereof is positioned in the circular path traversed by the protuberances of said first wheel to be depressed by any protuberance of said first wheel which is adjusted to said second distance as such protuberance is rotated to the position of the plunger, a second switch including a plunger which, when depressed, closes said second switch, said second switch being mounted so that the plunger thereof is positioned in the circular path traversed by the protuberances of said second wheel to be depressed by any protuberance of said second wheel which is adjusted to said second distance as such protuberance is rotated to the position of the plunger, and means for initially enabling said first means to cause said station plate to rotate when said first and second switches are coincidentally placed in their closed positions.

18. Apparatus as in claim 17 further comprising means for subsequently enabling said first means to cause said station plate to rotate after the initial enablement thereof.

19. In a system including a plurality of stations to which electrical power is selectively applied, timing control apparatus including:
 a rotatable station wheel including a plurality of manually positionable pins extending from one surface of said wheel, each pin corresponding to a different one of said stations,
 a first motor including a rotatable drive shaft,
 clutch means mounted about said drive shaft and responsive to electric current for engaging said shaft to thereby rotate with said shaft,
 a first switch including a plunger which, when depressed, causes said switch to open, and when extended, causes said switch to close, said switch being mounted on one side of said clutch means so that said plunger extends upwardly, a longitudinal arm, one end of which is pivoted about said drive shaft and the other end of which extends substantially horizontally from said shaft to a position contiguous to said one surface of said wheel, said arm resting on the plunger of said first switch so that as said clutch means is rotated, said other end of said arm is pivoted upwardly to engage one of said pins and to depress the plunger on said first switch upon continued rotation of said clutch means, and means for inhibiting the application of power to a selected station when said first switch is opened.

20. Apparatus as in claim 19 further including an index motor for causing said station wheel to rotate and successively position each of said pins in an index position and wherein said arm includes a lateral extension including a tab curving downwardly and in the direction from which said pins approach as said station wheel is rotated so that when a pin is manually positioned in a certain OMIT position, the pin contacts said tab and slides over the tab and extension forcing the arm downwardly to depress the plunger of said first switch.

21. Apparatus as in claim 20 further including a rotary switch having a plurality of stator contacts, each connected to a different one of said stations, and a wiper armature mechanically coupled to said index motor to rotate at the same rate as said station wheel and to contact a particular stator contact when the pin corresponding to the station to which the particular stator contact is connected is in the index position.

22. Apparatus as in claim 21 wherein said first switch includes a contact and an armature which is closed on said contact when the plunger of said first switch is extended and is opened from said contact when the plunger is depressed.

23. Apparatus as in claim 22 further including a relay having first and second sets of break-make contacts and a coil, one end of which is connected to a first power source and the other end of which is connected to the armature of said first switch, the break contact of said first set of contacts being connected to said index motor, the armature of said first set being connected to a second power source, the make contact of said first set being connected to the wiper armature of said rotary switch, the armature of said second set of contacts being connected to a ground potential source, and the make contact of said second set being connected to the contact of said first switch.

24. Apparatus as in claim 23 wherein said clutch means includes a clutch coil responsive to current for causing said clutch means to magnetically attract and engage the drive shaft of said first motor, one end of said clutch coil being connected to said first power source and the other end of said clutch coil being connected to the make contact of said second set of contacts.

25. Apparatus as in claim 24 further including a capacitor one side of which is connected to the contact of said first switch, means for discharging said capacitor when said station wheel is rotated, and a second switch for interconnecting the other side of said capacitor to a ground potential source when said station wheel is in the index position to thereby cause charging current to flow from said first power source via the coil of said relay and via said first switch to said capacitor when said first switch is closed.

26. Timing control apparatus including a timing wheel having a plurality of bores located near the perimeter of the wheel, the axes of said bores extending in a substantially perpendicular direction with respect to the plane of said wheel, said wheel including groups of fingers, each group positioned about a different bore, each finger of group extending from one face of the wheel in a direction substantially perpendicular to the plane thereof, the end of each finger being directed inwardly toward the axis of the bore about which the finger is positioned, a plurality of pins each insertably positioned in a different bore so that one end thereof extends beyond one surface of the wheel and the other end thereof extends beyond the other surface of the wheel, each of said pins being an elongated body, one end of which is tapered and one portion of which along the length of the pin has a reduced diameter, each of said pins being inserted in its corresponding bore so that the tapered end thereof extends in the same direction as said fingers and so that the ends of the fingers of the group positioned about the bore close about and engage said reduced portion of the pin to thereby secure the pin.

27. Apparatus as in claim 26 wherein the portion of each pin having a reduced diameter extends a sufficient distance along the length of the pin to allow the pin to be slidably moved between a first position, in which the ends of the fingers of the corresponding group abut against one shoulder formed by the diameter difference between the portion of reduced diameter and the rest of the pin, and a second position, in which the ends of the fingers abut against the other shoulder formed by said diameter difference.

References Cited
UNITED STATES PATENTS

| | | | |
|---|---|---|---|
| 2,851,099 | 9/1958 | Snoddy | 307—41 |
| 3,257,654 | 6/1966 | Rogers et al. | 200—38 DB |
| 3,319,019 | 5/1967 | Jullien-Davin | 200—38 R |

ROBERT K. SCHAEFER, Primary Examiner

M. GINSBURG, Assistant Examiner

U.S. Cl. X.R.

200—38 R